United States Patent
Murata

(10) Patent No.: US 6,346,857 B1
(45) Date of Patent: Feb. 12, 2002

(54) GAMMA CONVERSION CIRCUIT CHANGEABLE GAIN RATE AND AMPLIFING CAPABLE RANGE THEREOF

(75) Inventor: Toshikazu Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,621

(22) Filed: Apr. 21, 2000

(30) Foreign Application Priority Data

Apr. 23, 1999 (JP) ............................................. 11-116759

(51) Int. Cl.[7] .............................. H03F 3/45; H03G 3/10
(52) U.S. Cl. ........................................ 330/254; 327/359
(58) Field of Search .................................. 330/134, 254; 327/359

(56) References Cited

U.S. PATENT DOCUMENTS 4,156,283 A * 5/1979 Gilbert ........................ 327/359
5,122,760 A * 6/1992 Nishijima ..................... 330/254
5,914,637 A * 6/1999 Kagawa ........................ 330/254

FOREIGN PATENT DOCUMENTS

| JP | 3-45084 | 2/1991 |
| JP | 6-253175 | 9/1994 |
| JP | 8-9177 | 1/1996 |
| JP | 10-91779 | 4/1998 |

* cited by examiner

Primary Examiner—Steven J. Mottola
(74) Attorney, Agent, or Firm—Foley & Lardner

(57) ABSTRACT

A gamma conversion circuit of the present invention comprises: an input terminal; an output terminal; and a plurality of a voltage controlled amplifiers each coupled between the input terminal and the output terminal, each inputting an input voltage, a gain setting voltage, and a region setting voltage, and outputting an output voltage. The gain setting voltage sets an increasing rate of a gain of the output voltage during a unit period and the region setting voltage sets an amplifying operation region of the output voltage.

6 Claims, 15 Drawing Sheets

VCA CIRCUIT  GILBERT-TYPE MULTIPLIER CIRCUIT

EACH BLOCK GAIN OF A CONVENTIONAL CIRCUIT

GAMMA CONVERSION CIRCUIT CHANGEABLE GAIN RATE AND AMPLIFING CAPABLE RANGE THEREOF

BACKGROUND OF THE INVENTION

1. Field of the Invention

The present invention relates to a gamma conversion circuit which converts input-output characteristics especially in accordance with needs of users.

2. Description of the Prior Art

A gamma conversion circuit converts an input-output voltage in order to realize characteristics, especially those which users need. Such a gamma conversion circuit generally undergoes linear approximation with a differential amplifier circuit comprising an emitter resistance, but in recent years circuit design which can freely change gain setting of gamma conversion has been required.

Conventionally, in supposing the case that a gamma conversion curb is approximated with three straight lines, each block is configured by a differential amplifier circuit with emitter resistances RE1b and RE$_2$b as shown in FIG. 12.

Incidentally, a block diagram covering from an input (Vin) to an output (Vout) will be one as shown in FIG. 13 in which the above described differential amplifier circuit (FIG. 12) with an emitter resistance undergoes three-stage cascade connection.

However, the conventional has problems described below.

Each block, which is a differential amplifier circuit with an emitter resistance as shown in FIG. 12, can only undergo offsets adjustment in up-to-down and left-to-right directions as shown in FIG. 14 even if an external setting differential voltage V2 is changed. FIG. 14 shows three kinds of offset settings, and when an external setting voltage V2 for each block is adjusted, an input-output characteristics will be indicated in black dots and a thick line in FIG. 14.

A first problem of this circuit configuration (FIG. 12 and FIG. 13) is that the linear portion which approximates a gamma conversion curb is configured by a differential amplifier circuit with an emitter resistance. This will make it difficult to attain a gamma conversion curb having a free gain since any combination of various external setting voltages V2 will only stay within an adjustment range as in FIG. 15.

A reason therefor is that a differential amplifier circuit with an emitter resistance can not alter inclination of a line with the external setting voltage V2.

A second problem is that due to a circuit configuration in which a gain is set with a resistance the gain changes in accordance with dispersion of resistance in a product, thus a yield factor will decrease.

BRIEF SUMMARY OF THE INVENTION

By contemplating such problems, the present invention is achieved and objects thereof are to provide a gamma conversion circuit characterized by a gamma conversion curb having a free gain and with a high yield factor of products.

A gamma conversion circuit of the present invention comprises: an input terminal; an output terminal; and a plurality of variable gain circuits each coupled between the input terminal and the output terminal, each having an operation amplifier circuit inputting two input voltages and producing an output voltage;

wherein gain of said output voltage changes in accordance with a difference between two input voltages.

A gamma conversion circuit of the present invention comprises: an input terminal; an output terminal; and a plurality of a voltage controlled amplifiers each coupled between the input terminal and the output terminal, each inputting an input voltage, a gain setting voltage, and a region setting voltage, and outputting an output voltage;

wherein the gain setting voltage sets an increasing rate of a gain of the output voltage during a unit period, the region setting voltage sets an amplifying operation region of the output voltage.

A gamma conversion circuit having a voltage controlled amplifier, the amplifier comprises: a first differential amplifier responding a gain setting voltage to produce a first control signal; a second differential amplifier responding an input voltage and a region setting voltage to produce a second control signal; and a third differential amplifier responding the first control signal and the second control signal to produce an output signal.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

According to the present invention, a multistage connection of voltage-controlled variable gain circuits (Voltage Controlled Amplifiers: VCA circuits), in which a gain of an output voltage can be optionally altered with voltages being set outside, is made in a portion of a gamma conversion circuit in a display unit, and thus a free gamma conversion curb can be set.

Figure 1:
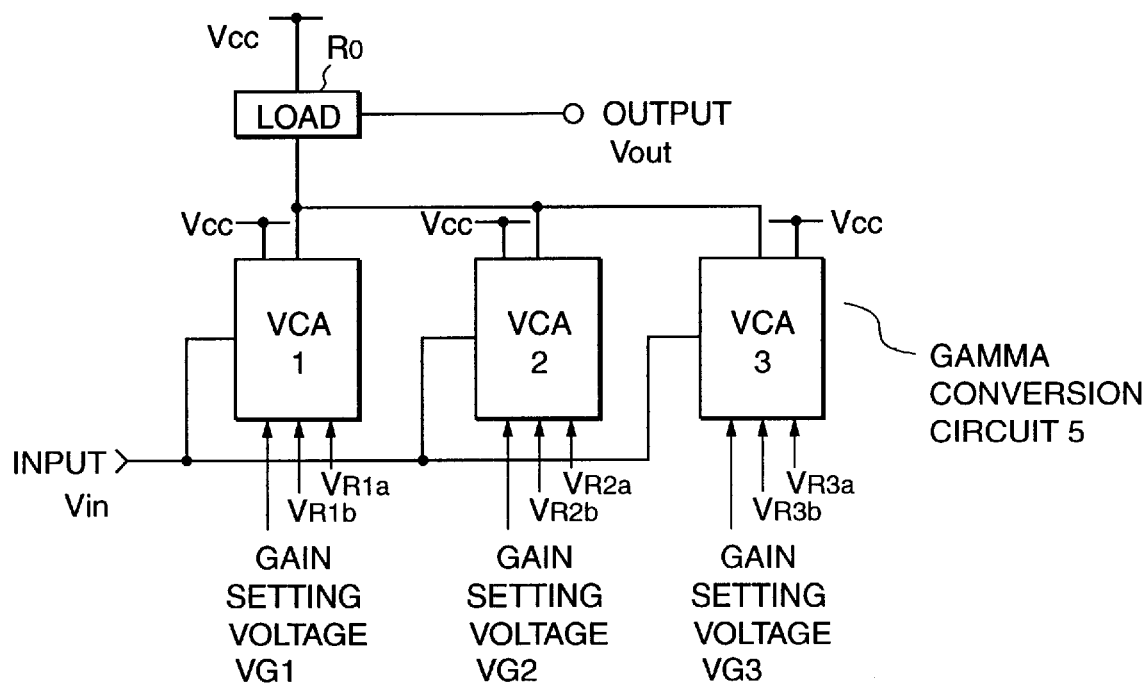
FIG. 1 is a block diagram of an electric circuit showing a practical embodiment of a gamma conversion circuit of the present invention.
Figure 3:
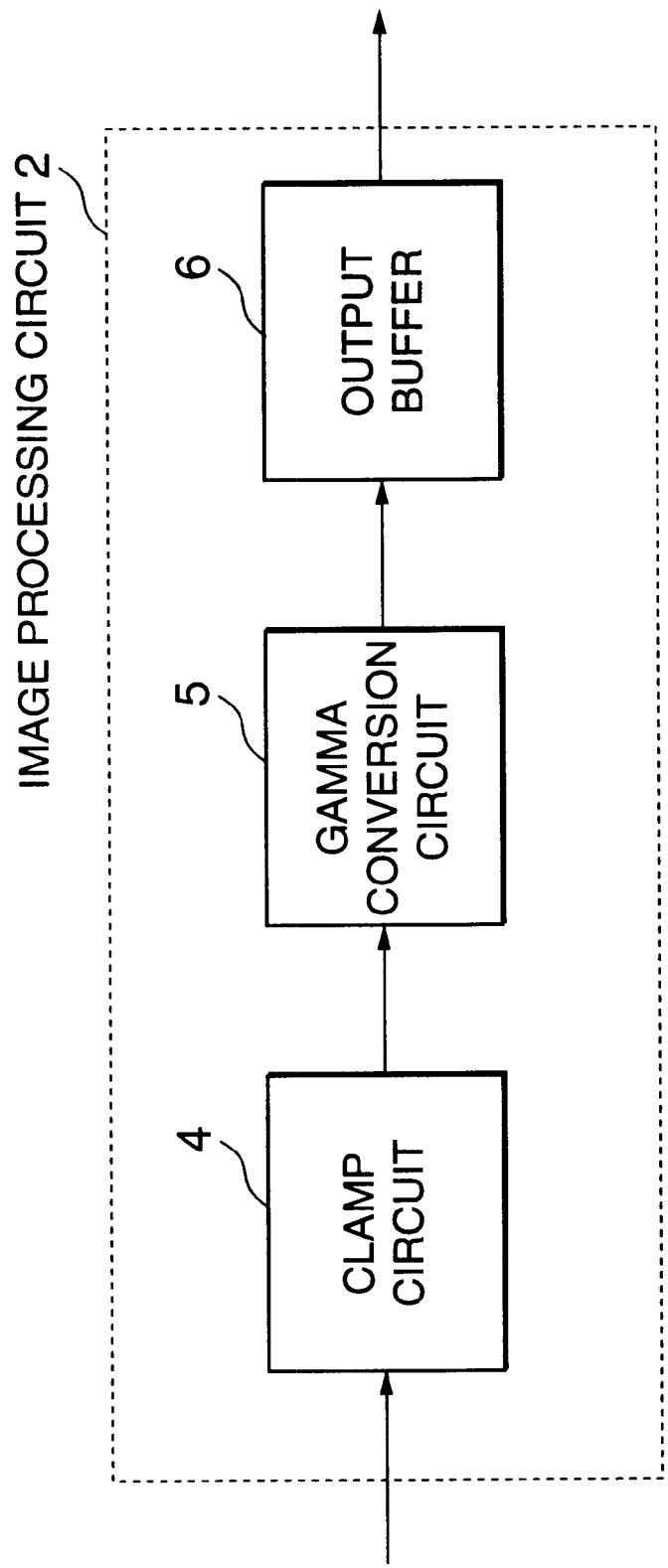
FIG. 3 is a block diagram on an electric circuit showing a configuration example of an image processing circuit 2 comprising a gamma conversion circuit 5 of the present invention.

In the configuration of an image processing circuit 2 as shown in FIG. 3, a gamma conversion circuit 5 is configured so that VCA circuit blocks VCA1, VCA2, and VCA3 are connected in parallel as shown in FIG. 1 in accordance with the present invention. The VCA circuit block VCA1 is configured by a basic circuit shown in FIG. 5, and the VCA circuit blocks VCA2 and VCA3 have the same configuration as that of the VCA circuit block VCA1.

Figure 6:
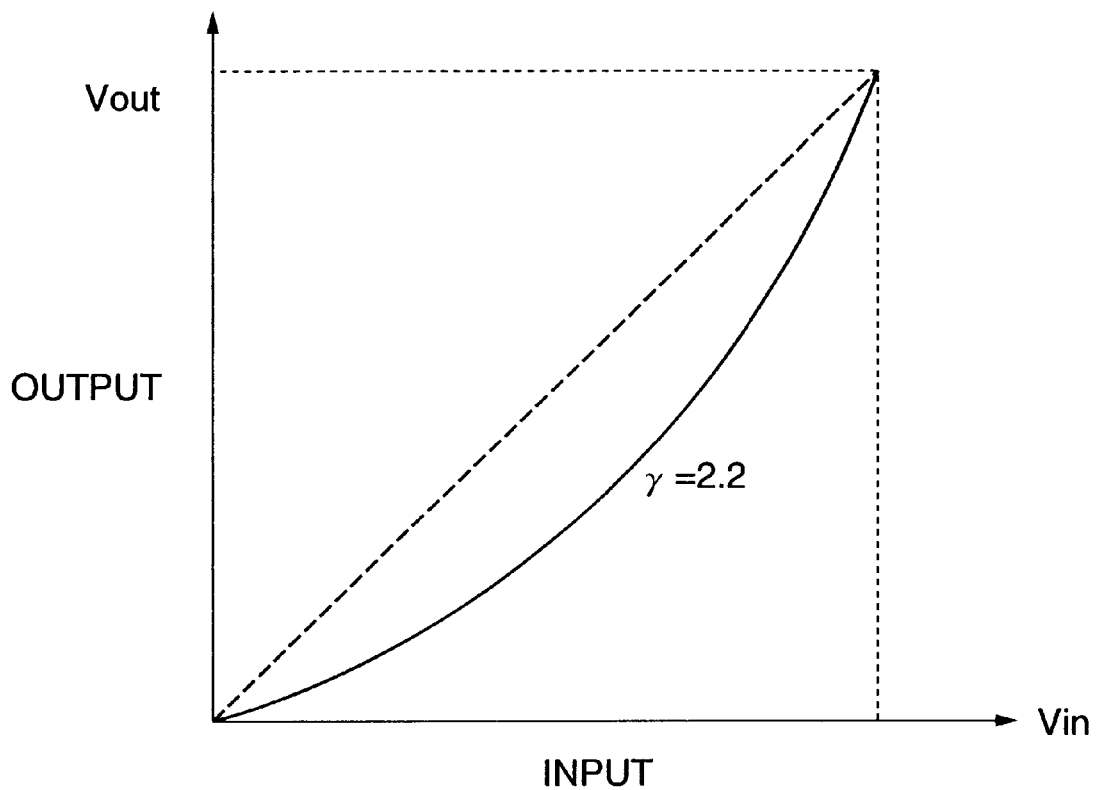
FIG. 6 is a graph showing a range of outputs Vout for inputs Vin of a VCA circuit block VCA1 shown in FIG. 1.

These VCA circuit blocks VCA1, VCA2, and VCA3, respectively, cover a certain range of an input voltage Vin as shown in FIG. 6, and a gain thereof can be optionally altered by outside gain setting voltages VG1, VG2, and VG3.

Accordingly, such an effect is attained that a gamma conversion curb will be able to be set freely by linear approximation.

Practical embodiments of the present invention will be detailed with reference to drawings as follows.

Figure 2:
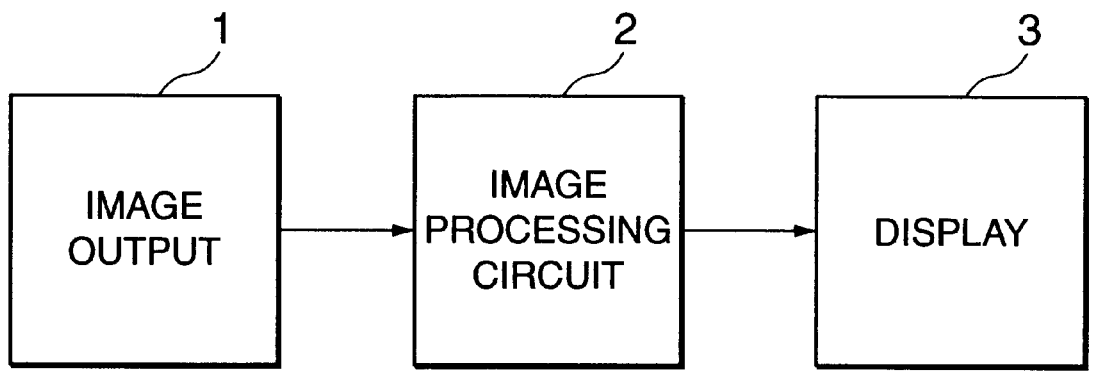
FIG. 2 is a block diagram showing an example in which an image processing circuit 2 comprising a gamma conversion circuit 5 of the present invention is applied to an image display system.

FIG. 2 is a block diagram showing an example of an image processing step to which the present invention is applied. An image output 1 in FIG. 2 is an image signal output device such as a TV tuner and a personal computer, etc., and this image signal is displayed in a display 3 via an image processing circuit 3. Here, in a display in the display 3, adjustment in characteristics in a display device or coloring will be necessary.

FIG. 3 is a block diagram showing a configuration of an image processing circuit 2 in the present practical embodiment, and an image signal being inputted undergoes clamping in a clamp circuit 4 as well as an input-output conversion of the image signal in a gamma conversion circuit 5, and thereafter is supplied to a display by an output buffer 6.

An internal connection in this gamma conversion circuit 5 is configured by VCA circuit blocks VCA1, VCA2, and VCA3 being disposed in parallel as shown in FIG. 1.

As shown in FIG. 1, the gamma conversion 5 related to the present practical embodiment comprises VCA circuit blocks VCA1, VCA2, and VCA3, and a load Ro being commonly connected thereto. An inputted voltage, that is, an input Vin, is inputted to VCA circuit blocks VCA1, VCA2, and VCA3, and in accordance with a range of input voltages of the input Vin, each block of the VCA circuit blocks VCA1 through VCA3 is operated. A gain for each block is set by gain setting voltages VG1 through VG3. An output from each VCA circuit block connected together, and is connected with a load Ro provided between itself and a power supply Vcc. A voltage (output Vout) outputted form this load Ro is supplied to the display 3 via the output buffer 6.

Figure 4:
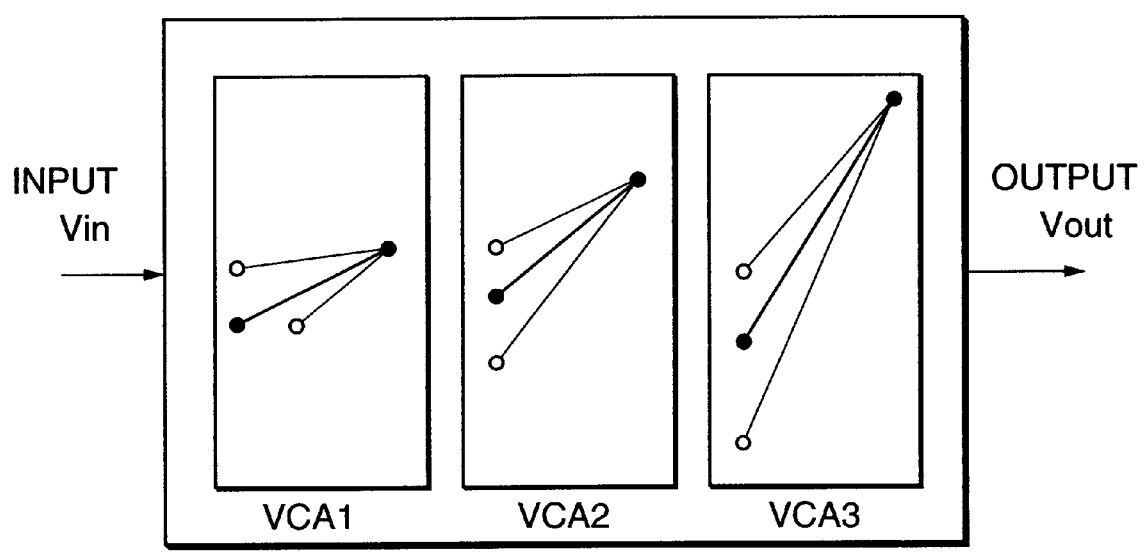
FIG. 4 is a block configuration diagram showing input output characteristics of a gamma conversion circuit 5 of the present invention.

As described above, the gamma conversion circuit 5 is realized with VCA circuit blocks VCA1, VCA2, and VCA3. In the present practical embodiment, the gamma conversion circuit 5 is configured by VCA circuit blocks VCA1, VCA2, and VCA3 undergoing three-stage connection as shown in FIG. 4.

Figure 5:
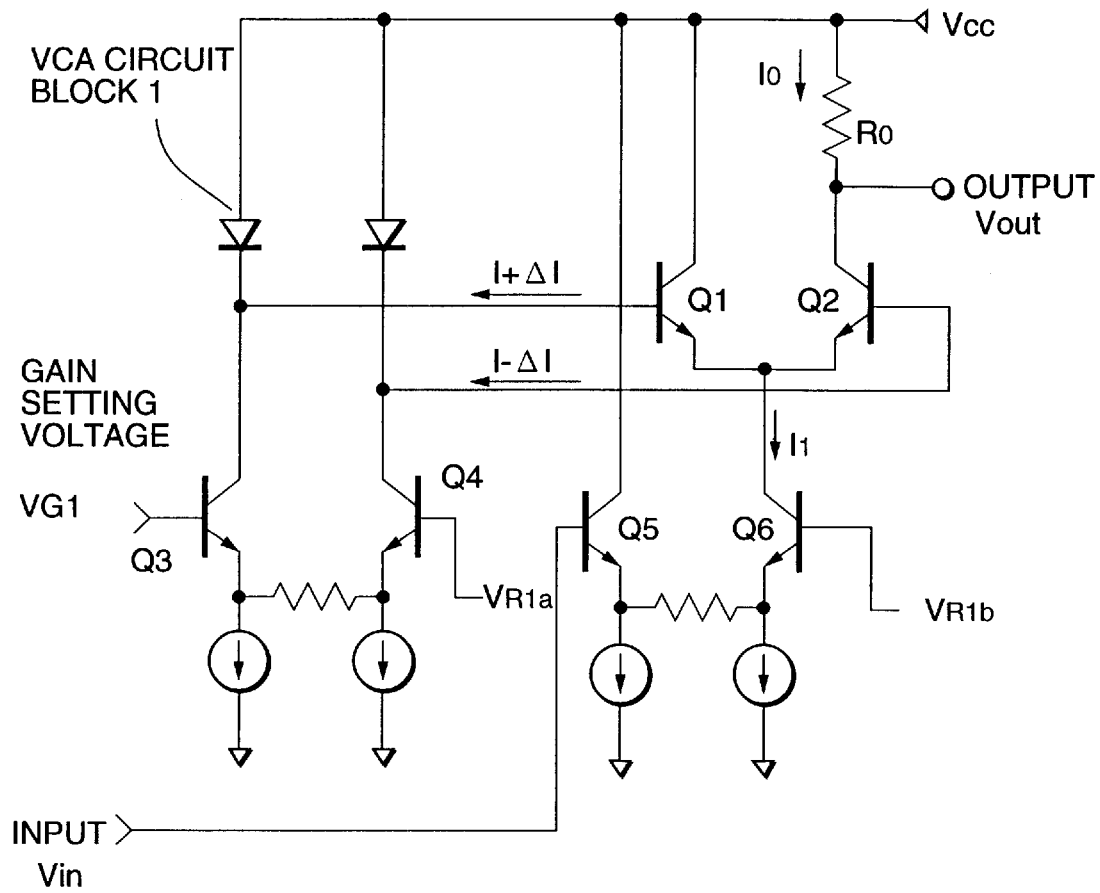
FIG. 5 is an electronic circuit diagram showing an internal circuit configuration of a VCA circuit block VCA1 shown in FIG. 1.

An internal basic circuit configuring the VCA circuit blocks VCA1, VCA2, and VCA3 is shown in FIG. 5. Here, for the purpose of simplification, a case where a gamma conversion curb is approximated with three straight lines will be considered.

The following is the explanation of the circuit structure of each VCA as shown in FIG. 5.

A NPN bipolar transistor Q1 has a collector coupled to a power source line, which is supplied with a power source Vcc. A NPN bipolar transistor Q2 has a collector coupled to the power source line via a resistor R0, and an emitter coupled to an emitter of the transistor Q1. An output terminal OUTPUT is coupled to the collector of the transistor Q2. A NPN bipolar transistor Q6 has a collector coupled to the emitters of the transistors Q1 and Q2, an emitter coupled to a constant current source, and a base supplied with a region setting reference voltage $V_{R1b}$. A NPN bipolar transistor Q5 has a collector coupled to the power source line, an emitter coupled to a constant current source, and a base supplied with an input voltage (signal) Vin. A resistor is coupled between the emitters of the transistors Q5 and Q6. A NPN bipolar transistor Q3 has a collector coupled to the power source line via a diode, an emitter coupled to a constant current source, and a base supplied with a gain setting voltage VG1. The collector of the transistor Q3 is coupled to a base of the transistor Q1. A NPN bipolar transistor Q4 has a collector coupled to the power source line via a diode, an emitter coupled to a constant current source, and a base supplied with an inclination setting reference voltages $V_{R1a}$. The collector of the transistor Q4 is coupled to a base of the transistor Q2. A resistor is coupled between the emitters of the transistors Q3 and Q4.

Figure 7:
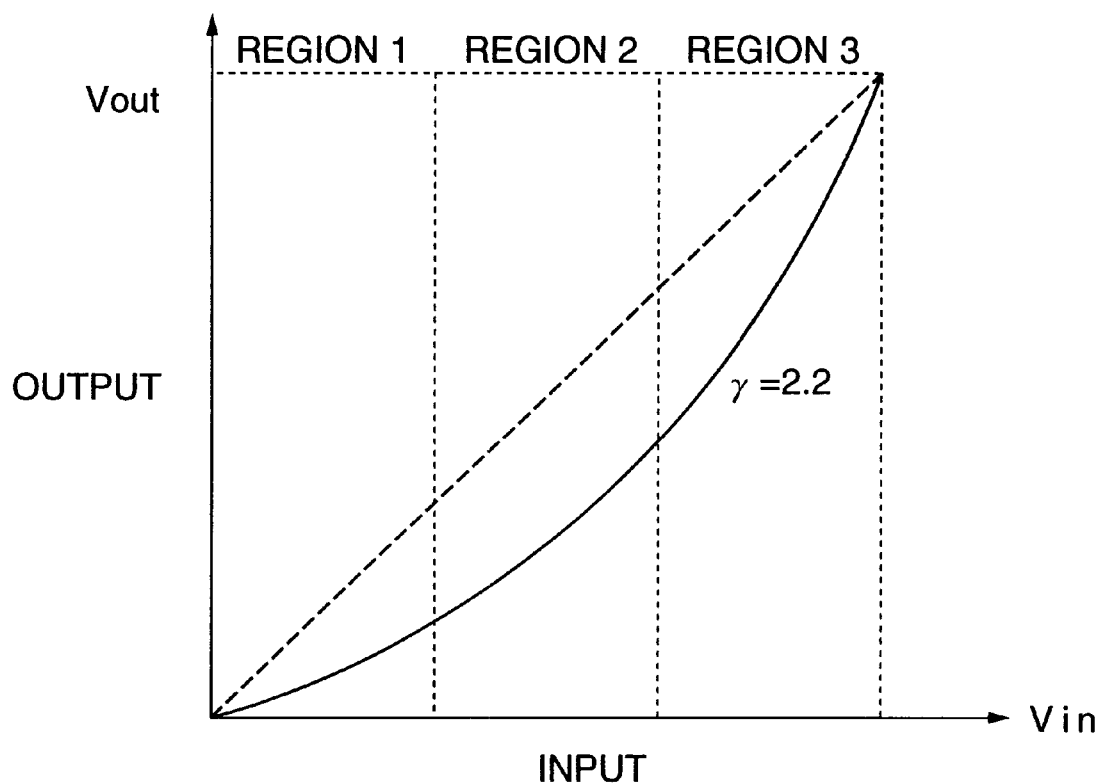
FIG. 7 is a graph showing operation regions as well as outputs Vout for inputs Vin of VCA circuit blocks VCA1, VCA2, and VCA3 shown in FIG. 1.

As shown in FIG. 6, when an input voltage Vin is being varied as a horizontal axis, it is necessary for a display to undergo input-output conversion (gamma conversion) with a curb of γ=2.2. Here, as shown in FIG. 7, a region setting reference voltage $V_{R1b}$ shown in FIG. 5 is adjusted so that each one third of an input voltage range is allocated to each block.

Since each VCA circuit block VCA1, VCA2, and VCA3 is a VCA circuit, any gain can be set up by a gain setting voltage VG1 being an external setting difference in FIG. 5. If the transistor Q1 and the transistor Q2 are balanced, a current Io flowing through the load Ro will be Io=11. When the gain setting voltage VG1 is altered, the transistor Q1 and the transistor Q2 undergo changes by a base voltage of ±ΔI, and therefore the balance between the transistor Q1 and the transistor Q2 will fall apart, giving rise to, for example, Io=(1/2)×I$_1$. That is, for an input change, the following transition takes place:

$$(1/2) \times I_1 \rightarrow (2/3) \times I_1$$

And therefore, a voltage drop ratio of the load Ro changes.

Here, inclination setting reference voltages $V_{R1a}$, $V_{R2a}$, and $V_{R3a}$ are for determining an inclination level of a gain inclination, and region setting reference voltages $V_{R1b}$, $V_{R2b}$, and $V_{R3b}$ are for determining an inclination center of a gain inclination, and all of them can be set up from outside. That is, the region is an amplifying operation region which means an amplifying operation is controllable, capable, or operatable within its region. Beyond the region, the output voltage is a constant. The output voltage keeps a constant, that is, the amplifying operation is not performed when an input voltage is changed outside of the region.

Figure 8:
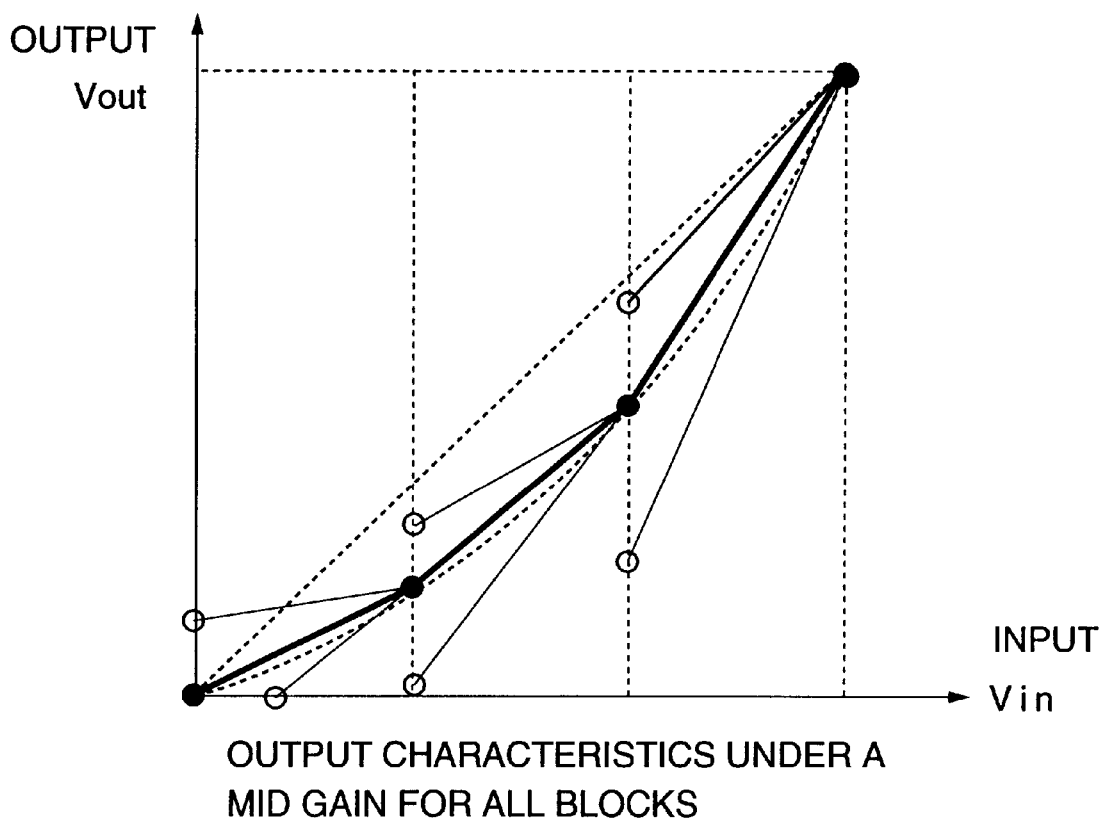
FIG. 8 is a graph showing input-output characteristics under a mid gain for all VCA circuit blocks VCA1, VCA2, and VCA3.

FIG. 4 shows the case where three types of gains are set up for VCA circuit blocks VCA1, VCA2, and VCA3 to which each region is allocated and, in the case where all blocks select a mid gain, input-output characteristics will be indicated by black dots and a thick line as shown in FIG. 8, and thus linear approximation of a desired gamma curb will become possible.

Figure 9:
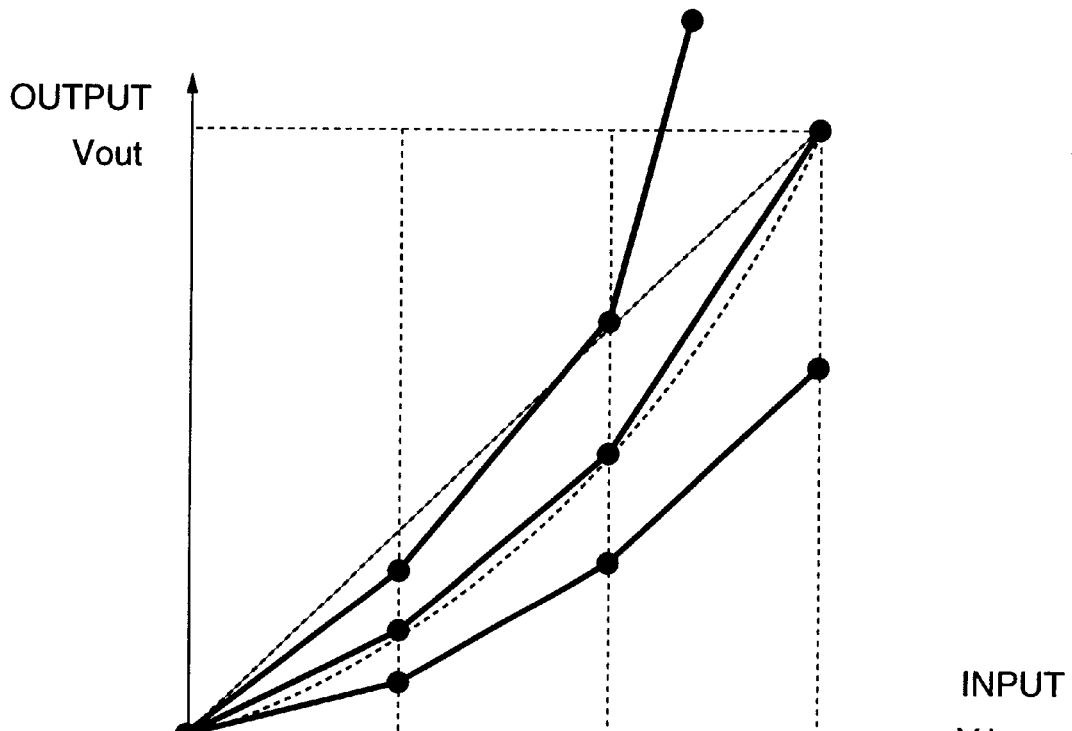
FIG. 9 is a graph showing input-output characteristics under various combinations of gains for VCA circuit blocks VCA1, VCA2, and VCA3.

Thus, examples of gamma conversion curbs for cases where various gains are combined are shown in FIG. 9.

When the maximum output voltage of each of VCA1, VCA2, and VCA3 (an output voltage (a black dot) at its right end of each VCA in FIG. 4) is controllable by changing values of the constant current sources coupled to the transistors Q5 and Q6 in its up and down direction of FIG. 4 and changing the region setting reference voltage VR1b in its right and left direction of FIG. 4.

When the region setting voltage VR1b changes in a case that the difference voltage between the gain setting voltage VG1 and the inclination setting reference voltage VR1a is a constant, the region of each VCA changes in its right and left direction in FIGS. 4, 7–9 with keeping the width of the region.

When the difference voltage between the gain setting voltage VG1 and the inclination setting reference voltage VR1a changes in a case that the region setting voltage VR1b is a constant, the inclination of the output voltage changes from the maximum output of each VCA as its starting point in FIGS. 4, 7–9.

The gamma conversion circuit 5 related to the practical embodiment, which is configured as described above, thus will give rise to effects described as follows.

A first effect is that a voltage set up from outside can freely perform gamma conversion at any time, compared with a conventional gamma conversion circuit with a fixed inclination. The reason therefor is that a gamma conversion curb undergoes linear approximation with a VCA circuit so that a gain can be set up with an external differential voltage.

A second effect is that dispersion in products can be adjusted with a voltage externally set up. The reason therefor is that gains for VCA circuits VCA1, VCA2, and VCA3 can be adjusted with differential voltages VG1, VG2, and VG3 externally set up.

In an embodiment of the present invention, a gamma conversion curb undergoes linear approximation with three VCA circuit blocks VCA1, VCA2, and VCA3, but there are no limitations on a number of blocks. In addition, an increase in a number of blocks enables it to be applied to a device having a special gamma conversion curb such as liquid crystal display, etc.

Figure 10:
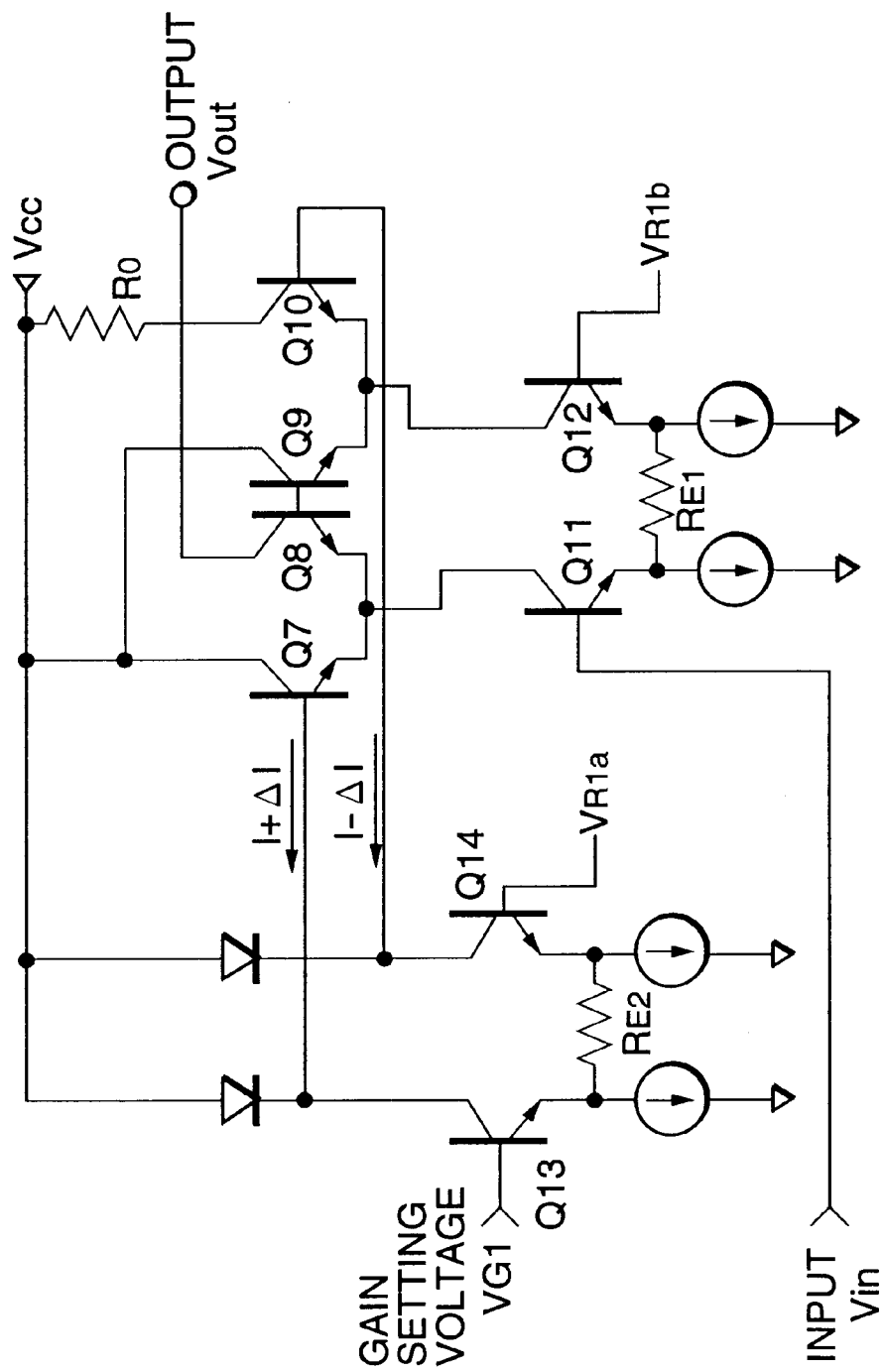
FIG. 10, which shows another practical embodiment of the present invention, is an electronic circuit diagram showing an internal circuit of VCA circuit blocks VCA1, VCA2, and VCA3, to which a Gilbert-type multiplier circuit is applied.

As another embodiment of the present invention, the one having its basic configuration as described above, in which, however, a VCA circuit is replaced with a Gilbert-type multiplier circuit, is shown in FIG. 10.

The following is the explanation of the circuit structure of the Gilbert-type multiplier circuit as shown in FIG. 10.

A NPN bipolar transistor Q7 has a collector coupled to a power source line, which is supplied with a power source Vcc. A NPN bipolar transistor Q8 has a collector coupled to an output terminal OUTPUT and an emitter coupled to an emitter of the transistor 7. A NPN bipolar transistor Q9 has a collector coupled to the power source line and a base coupled to a base of the transistor 8. A NPN bipolar transistor Q10 has a collector coupled to the power source line via a resistor RO and an emitter coupled to an emitter of the transistor Q9. A NPN bipolar transistor Q11 has a collector coupled to the emitters of the transistors Q7 and Q8, an emitter coupled to a constant current source, and a base supplied with an input voltage Vin. A NPN bipolar transistor Q12 has a collector coupled to the emitters of the transistors Q9 and Q19, an emitter coupled to a constant current source, and a base supplied with a region setting reference voltage $V_{R1b}$. A resistor RE1 is coupled between the emitters of the transistors Q11 and Q12. A NPN bipolar transistor Q13 has a collector coupled to the power source line via a diode, an emitter coupled to a constant current source, and a base supplied with a gain setting voltage VG1. The collector of the transistor Q13 is coupled to a base of the transistor Q7. A NPN bipolar transistor Q14 has a collector coupled to the power source line via a diode, an emitter coupled to a constant current source, and a base supplied with an inclination setting reference voltages $V_{R1a}$. The collector of the transistor Q14 is coupled to a base of the transistor Q10. A resistor RE2 is coupled between the emitters of the transistors Q13 and Q14.

Figure 11:
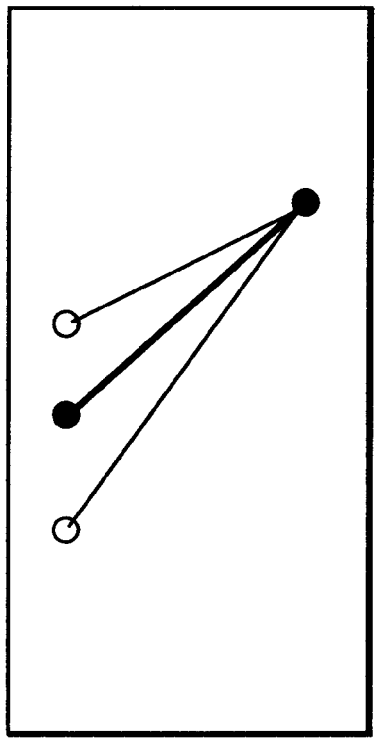
FIG. 11 is a graph showing input-output characteristics of a VCA circuit and of a Gilbert-type multiplier circuit.
Figure 11:
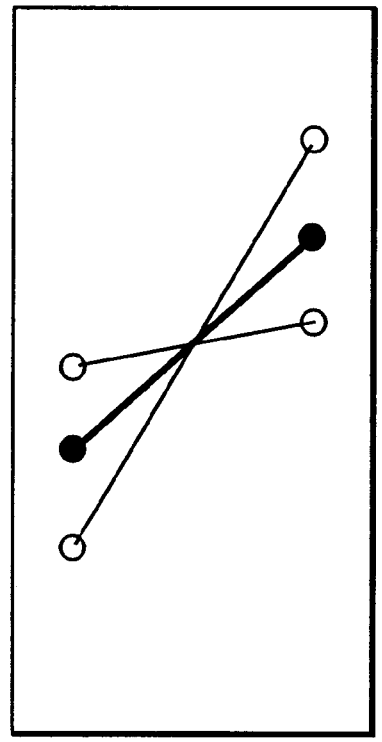
Figure 12:
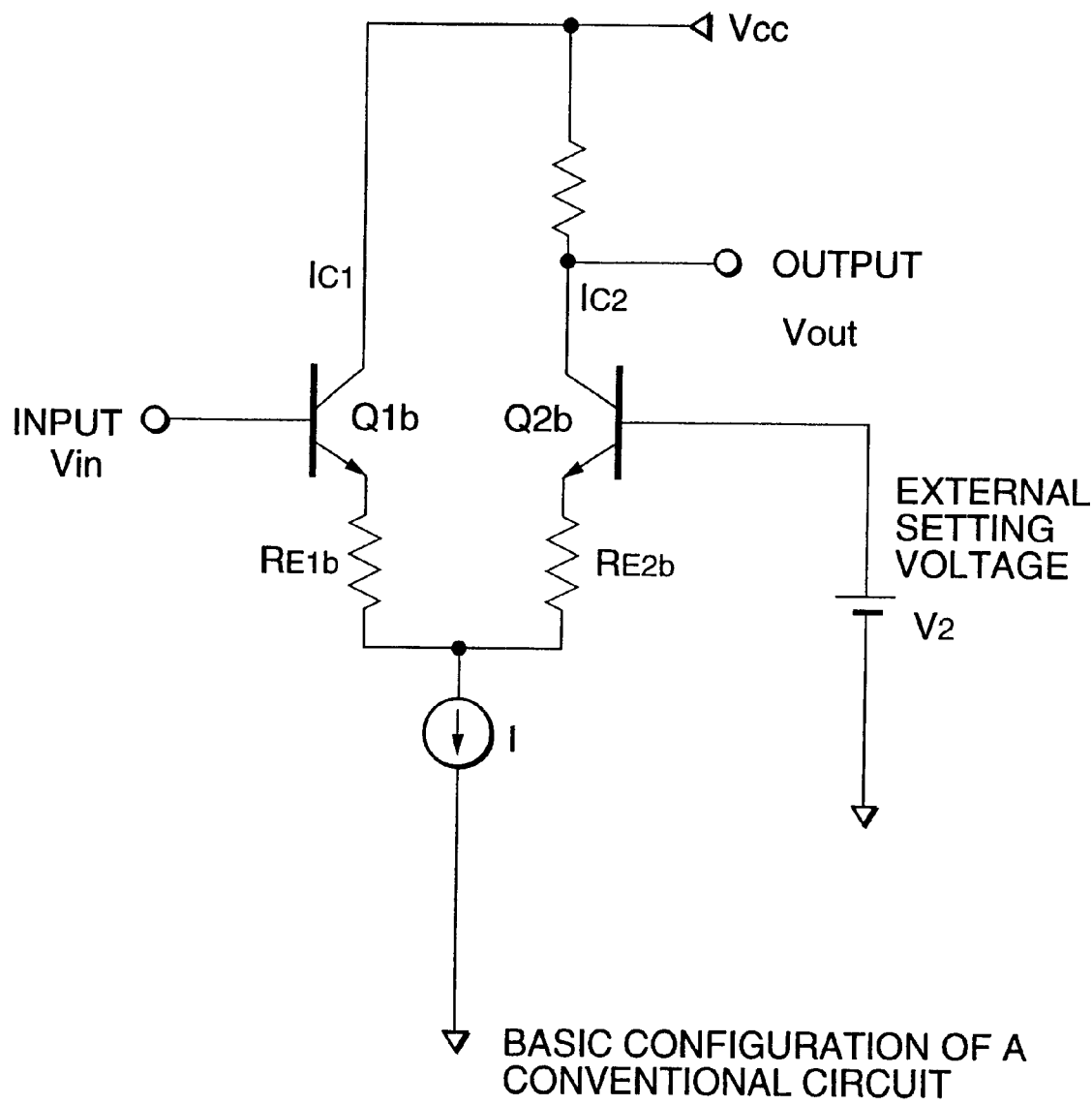
FIG. 12 is an electronic circuit diagram showing a conventional gamma conversion circuit.
Figure 13:
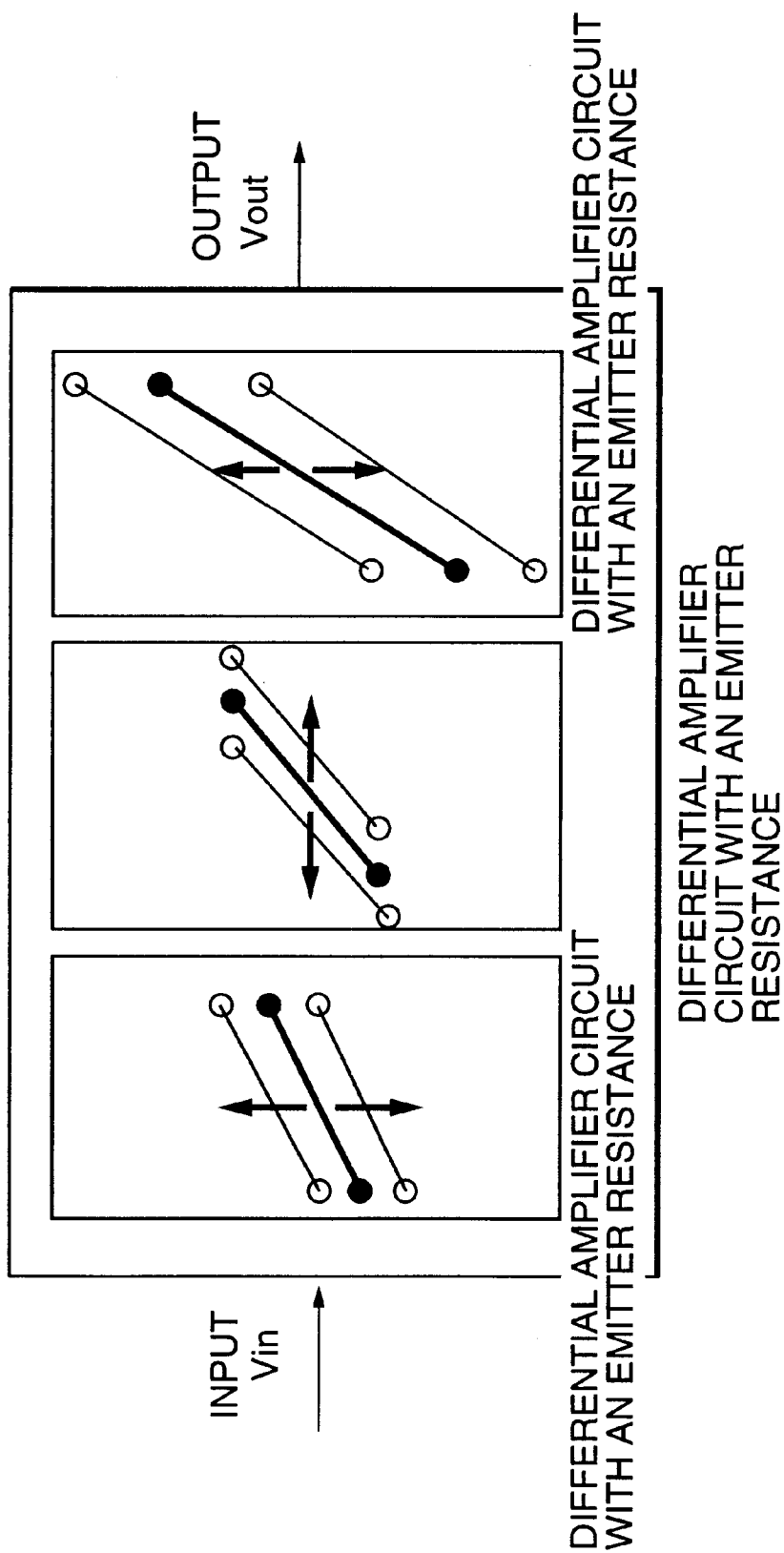
FIG. 13 is a block configuration diagram showing input-output characteristics of the conventional gamma conversion circuit.
Figure 14:
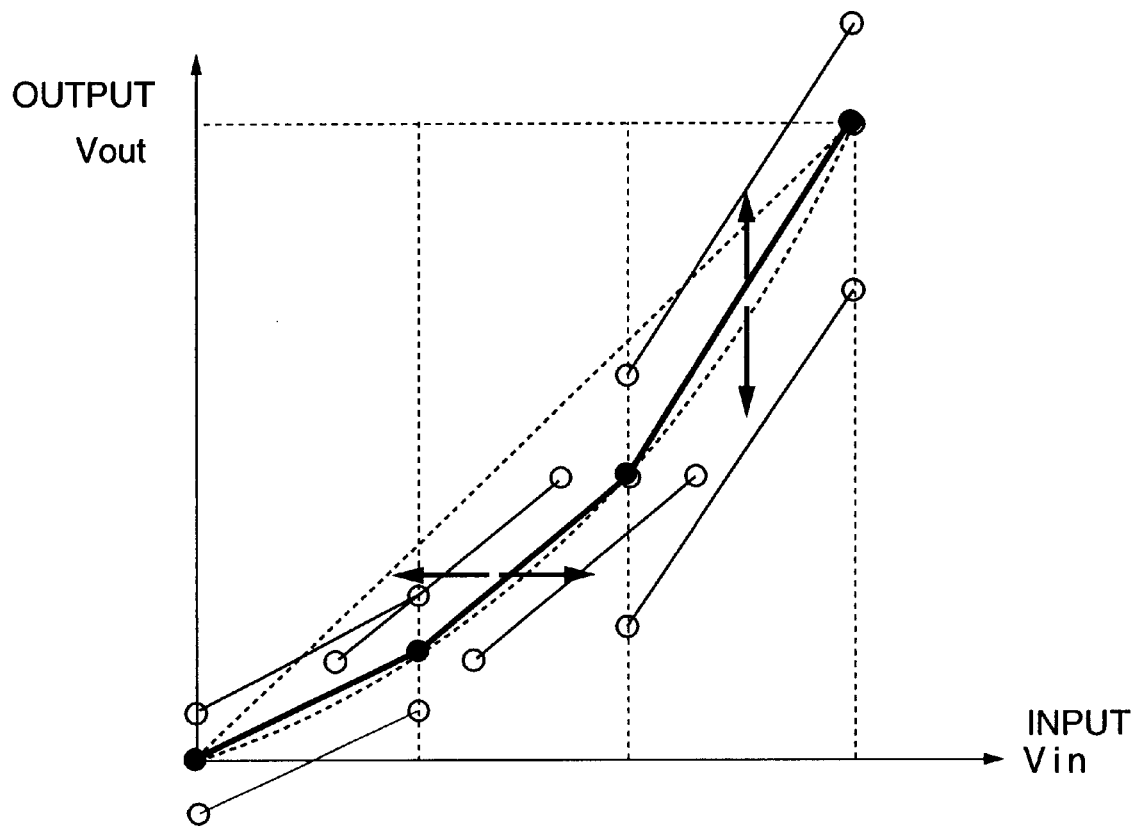
FIG. 14 is a graph showing ranges of gain changes in each block of the conventional gamma conversion circuit.
Figure 15:
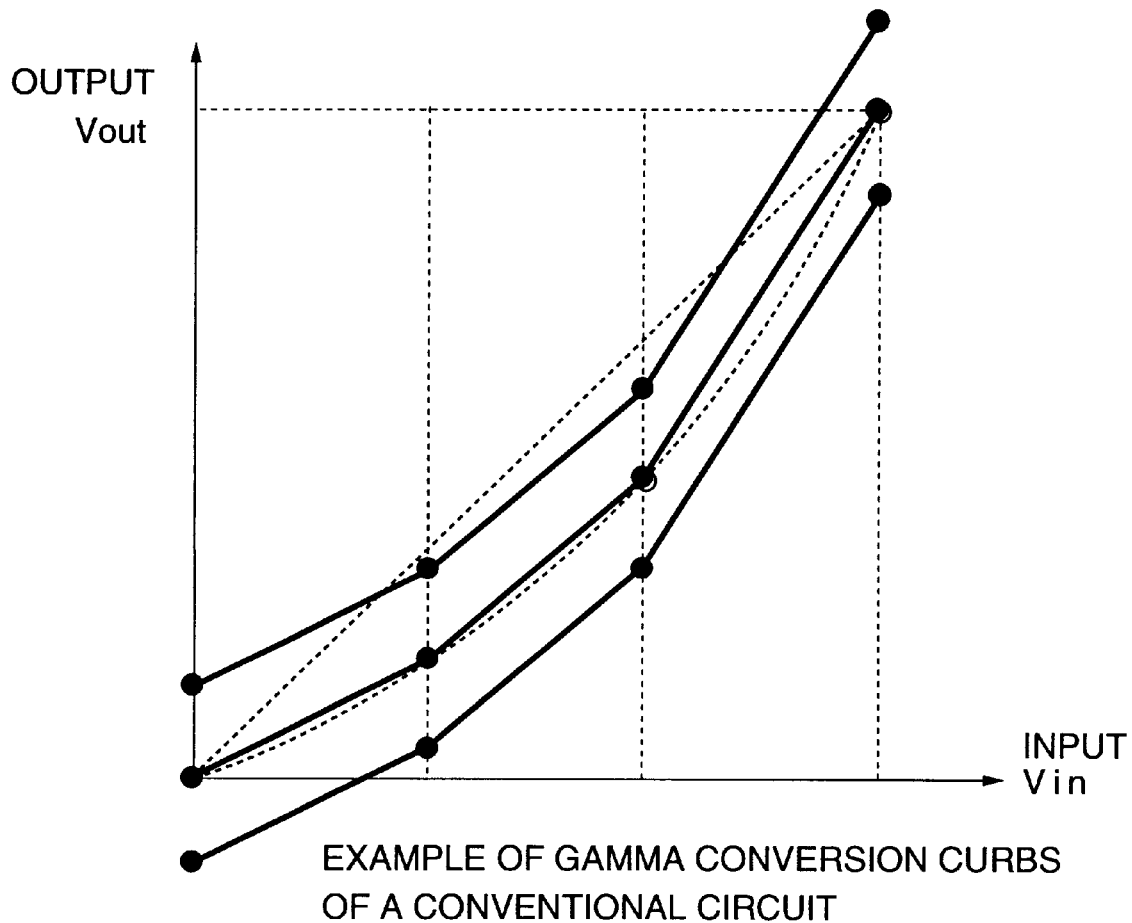
FIG. 15 is a graph showing input-output characteristics of the conventional gamma conversion circuit.

In FIG. 10, its basic operation remains same with the circuit in FIG. 5, but a gain inclination thereof can be altered with a mid point in an input voltage range as shown in FIG. 11.

Incidentally, the present practical embodiment, to which the present invention is not limited, can be applied to a suitable mode to which the present invention is applied.

In addition, quantities, positions, and shapes, etc. are not limited to the above described practical embodiment, but suitable quantities, positions, and shapes, etc. can be selected for the present invention to be embodied.

Incidentally, in each drawing, a same reference numeral denotes a same configuring element.

The present invention, which is configured as described above, is featured by a gamma conversion curb having a free gain, and in addition, gives rise to an effect that a gamma conversion circuit with a high yield factor on products can be provided.

What is claimed is:

1. A gamma conversion circuit having a voltage controlled amplifier, said amplifier comprising:

a first differential amplifier responding a gain setting voltage to produce a first control signal;

a second differential amplifier responding an input voltage and a region setting voltage to produce a second control signal; and a third differential amplifier responding said first control signal and said second control signal to produce an output signal; and wherein said first differential amplifier includes:

a first transistor coupled between a first node and a second node, and having a first control electrode receiving said gain setting voltage; and a second transistor coupled between a third node and said second node, and having a second control electrode receiving a reference voltage;

and wherein said second differential amplifier includes:

a third transistor coupled between a fourth node and a fifth node, and having a third control electrode receiving said input voltage; and a fourth transistor coupled between a sixth node and said fifth node, and having fourth control electrode receiving said region setting voltage; and wherein said third differential amplifier includes:

a fifth transistor coupled between a seventh node and said sixth node, and having a fifth control electrode coupled to said first node; and a sixth transistor coupled between an output node and said sixth node, and having a sixth control electrode coupled to said third node; and wherein said fourth node and said seventh node are coupled to a power source line.

2. The gamma conversion circuit as claimed in claim 1, wherein said first and second nodes are coupled to said power source line via respective diodes.

3. The gamma conversion circuit as claimed in claim 2, wherein a resistor is coupled between said output node and said power source line.

4. The gamma conversion circuit as claimed in claim 3, wherein a first constant current source is coupled to said second node and a second constant current source is coupled to said fifth node.

5. A gamma conversion circuit having a voltage controlled amplifier, said amplifier comprising:
   a first differential amplifier responding a gain setting voltage to produce a first control signal;
   a second differential amplifier responding an input voltage and a region setting voltage to produce a second control signal; and
   a third differential amplifier responding said first control signal and said second control signal to produce an output signal; and
   wherein said first differential amplifier includes:
      a first transistor coupled between a first node and a second node, and having a first control electrode receiving said gain setting voltage; and
      a second transistor coupled between a third node and said second node, and having a second control electrode receiving a reference voltage;
   and wherein said second differential amplifier includes:
      a third transistor coupled between a fourth node and a fifth node, and having a third control electrode receiving said input voltage; and
      a fourth transistor coupled between a sixth node and said fifth node, and having fourth control electrode receiving said region setting voltage; and
   wherein said third differential amplifier includes:
      a fifth transistor coupled between a seventh node and said fourth node, and having a fifth control electrode coupled to said first node;
      a sixth transistor coupled between an output node and said fourth node, and having a sixth control electrode;
      a seventh transistor coupled between said seventh node and said sixth node, and having a fifth control electrode coupled to said sixth control electrode;
      a eighth transistor coupled between an eighth node and said sixth node; and having a sixth control electrode coupled to said second node;
      wherein a resistor is coupled between a power source line and said eighth node;. wherein said seventh node is coupled to said power source line; and
      wherein a first diode is coupled between said power source line and said first node, a second diode is coupled between said power source line and said third node.

6. The gamma conversion circuit as claimed in claim 5, wherein a first current source is coupled to said second node and a second current source is coupled to said fifth node.

* * * * *